United States Patent [19]

Williams

[11] 4,244,354
[45] Jan. 13, 1981

[54] SOLAR PANEL

[76] Inventor: Douglas J. Williams, P.O. Box 55083, Valencia, Calif. 91355

[21] Appl. No.: 2,256

[22] Filed: Jan. 10, 1979

[51] Int. Cl.³ .............................................. F24J 3/02
[52] U.S. Cl. ................................... 126/448; 126/901; 126/447
[58] Field of Search ................ 126/441–445, 126/447, 448, 449, 901; 237/1 A; 165/71

[56] References Cited

U.S. PATENT DOCUMENTS

| 3,102,532 | 9/1963 | Shoemaker | 126/441 |
| 4,062,352 | 12/1977 | Lesk | 126/445 |
| 4,114,597 | 9/1978 | Erb | 126/448 |
| 4,116,225 | 9/1978 | Ortabasi | 126/448 X |
| 4,137,097 | 1/1979 | Kelly | 126/441 |
| 4,178,911 | 12/1979 | Mattson | 126/449 |

Primary Examiner—George T. Hall
Attorney, Agent, or Firm—Christie, Parker & Hale

[57] ABSTRACT

A solar heating and cooling panel which has a plurality of conduits through which fluid flows in one or more layers, said conduits being formed by structural elements, said structural elements being attached or in contact with additional elements so as to form additional conduits for fluid flow or insulation, and in such manner as to have structural integrity for force vectors through the layers comprising the panel. The unit is designed to allow introduction of selective absorbent such as $CO_2$ into the conduit to create additional insulation and radiation entrapment. Such selective absorbent or transmitter may be a coating sprayed or otherwise affixed to one or more surfaces comprising the conduits. The unit is designed to have low flow restriction, selectivity of channels, deep channel re-radiation entrapment, and greenhouse efect re-radiation entrapment. In addition, a process of manufacture includes extrusion of plastic, vacuum molding of sheets of plastic, use of tubing and channels, etc.

26 Claims, 5 Drawing Figures

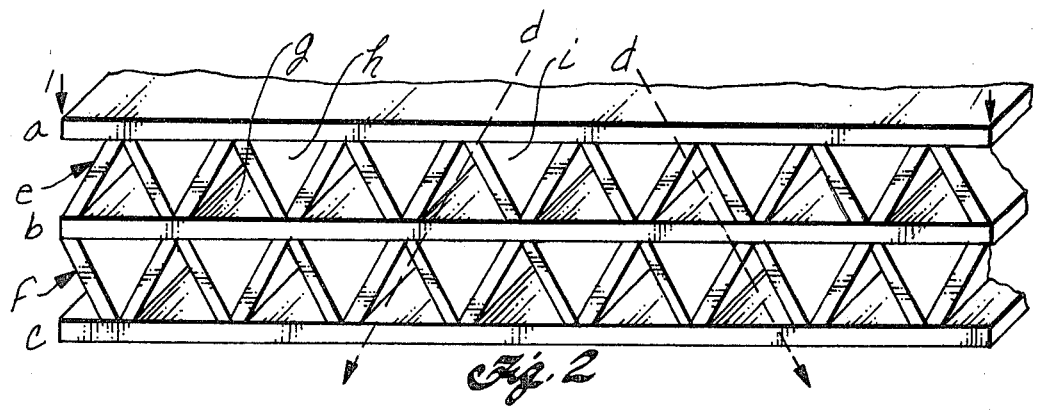
Fig. 2
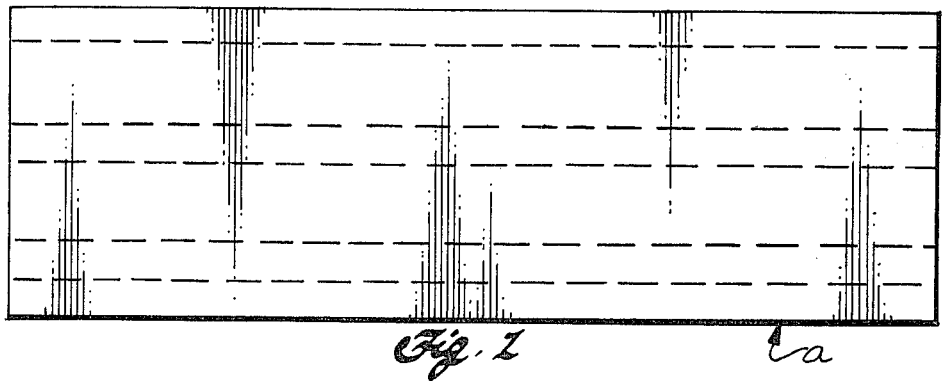
Fig. 1
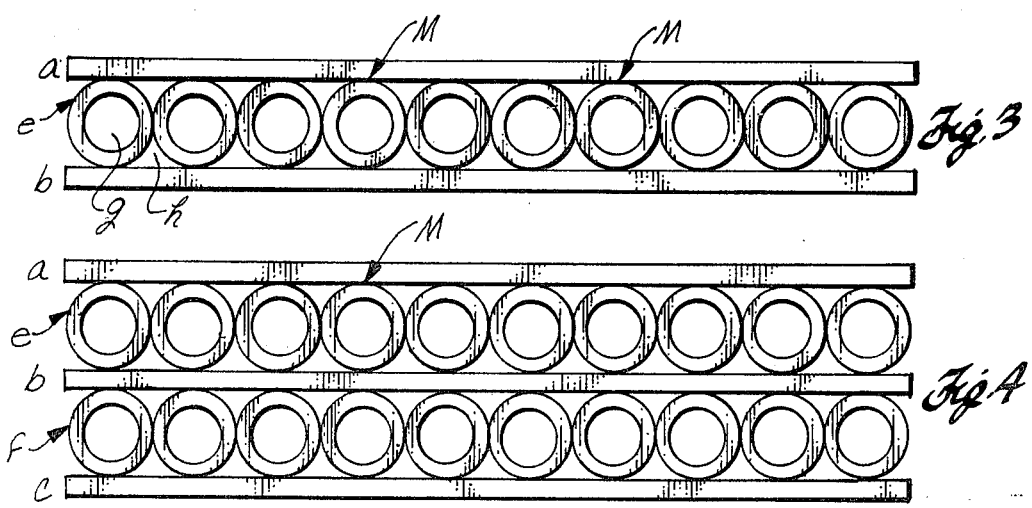
Fig. 3
Fig. 4
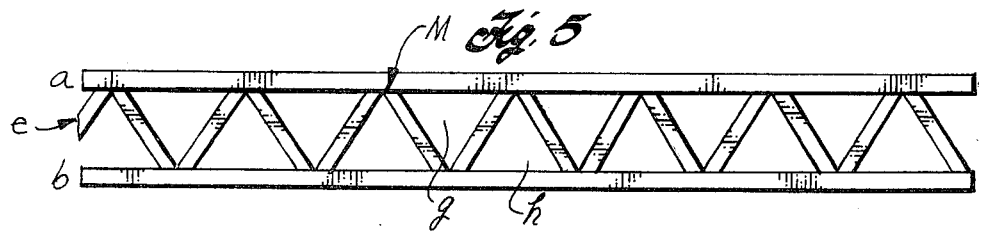
Fig. 5

SOLAR PANEL

DISCUSSION OF PRIOR ART

In the past, solar panels have either been made in such a way as to have no insulation beyond the fluid passage into the environment, allowing convection, re-radiation, and conduction losses of heat, or have had a glazing (usually a glass panel) placed across the top of the fluid passages, but not in touch with them, which allowed some minor convection loss protection. No design has dealt with the concepts of thermodynamics or of structural strength prior to this disclosure. Since solar panels are used in, on and around structures, and since efficiency of the heat extracting process is desired to be high, it would be desirable to invent a unit which embodied both concepts into one unit. Previously, with glazing it was impossible to, for example, walk on the unit. The alternative was to lose the insulation qualities to gain structural integrity. In addition, some previous designs required the fluid to flow through curvilinear channels, which added greatly to flow friction and necessitating additional pumping energy. The subject invention as herein disclosed addresses these problems and incorporates solutions in one design. The utility of such a unit is obvious, and the need in this day of energy awareness established.

SUMMARY OF THE INVENTION

The subject of this application is a high efficiency structurally sound solar heating and cooling panel which is capable of using and incorporating many techniques for acceptance of incoming solar energy, and subsequent entrapment of re-radiation. The preferred embodiment as illustrated in the attached drawings shows a panel with a cross section having two continuous convoluted structures located between three essentially flat plates. The convolutions are such as to form triangular cross sections for the fluid channels. These channels are interdigitated in such a way that some channels have a flat surface contact with the outside environment, and alternate channels have only a point contact with the outside environment. The advantage of this design can best be understood by examining the function of the panel in a supposed use situation. When used as a solar heating panel, the channels having a flat contact with the middle flat plate fluid circulating through them. These channels have only a point contact with the outside world, so loss of heat by convection is minimized. The adjacent channels have no fluid flow, thus allowing dead air, vacuum, or other insulation means which do not block flow of solar radiation to the interior channels and the contained fluid. With respect to the insulation properties of the exterior channels, the insulation process can be accomplished through the use of uncirculated air, the creation of a vacuum, or the introduction of a selective transmission media. By selective transmission media I refer to the nature of solar energy which if shortwave in nature, emanating from a high temperature body, and the opposing reradiation from the panel surfaces and fluid which is essentially longwave in nature. Thus the introduction of a coating on selected surfaces which allows shortwave radiation to pass through, but traps longwave reradiation, not allowing the radiant energy to escape greatly increases the efficiency of the panel. This effect, similar to the "Greenhouse effect" can also be accomplished by use of a selective media introduced in the appropriate channel. One such selective media is carbon dioxide. It is intended that the use of either method of selective transmission be part of this patent, and protected in its use in this and other panels. Thus in this use, for example, the interior channels have circulation of fluid passing through in an uncurved manner essentially isolated from the outside environment by the exterior channels which protect the fluid which is gathering solar energy from losing that energy by eliminating loss by convection, not allowing a path for conduction loss, and selectively trapping reradiation by use of a selective media such as $CO_2$ and a selective coating on, for example, one or more surfaces of the exterior plates. The triangular cross section design affords two additional benefits. First, the triangles are oriented in such a way that a continuous wall allowing transmission of force vectors through the entire panel and the surface below are established. And second, the configuration allows the development of deep channels, which, because of their reflective and refractive angles facilitates additional entrapment of radiation.

The cross section has been described using trianglular cross sections. It is intended to be within the scope of this invention that any desired cross section can be used. In addition, any desired thickness of structures, or variation of thickness in structures is intended to be within the scope of this invention. The orientation of the channels, as well as the number, proximity, and relative orientation of these, as well as the number of layers of channels are intended to be variable, and such variation is intended to be within the scope of this invention.

The unit has been discussed as constructed out of three sheets of flat material, and two additional convoluted sheets of material. It is intended that the panel could be made by this or other means such as extrusion, combination of triangular, round or oval tubes, or any combination of these.

The structure is shown as a series of channels formed by the combination of panels described above. Further, these panels are shown to be straight, parallel, and of consistent orientation with themselves and edges. This is the lowest restriction design. It is intended that these parameters could be changed, and such changes are intended to be within the scope of this invention.

When constructing the panel, one or more, or none, of the panels or convoluted panels may be translucent or black, or any other desired material or nature, or color. The selection of the examples above are for illustrative purposes and are not intended to be restrictive.

The panel which is the subject of this invention is intended to be from any desired material, such as copper, brass, aluminum, glass, plastic, etc., or any combination thereof. Further it is intended that to be within the scope of this invention that any portion or combination of portions of this panel could be impregnated or coated with a substance, such as carbon, which is an infra red absorber to assist in the collection and retention of said radiation.

The advantages to this design are many, some of which are: multiple choice of channels allows variability for accomplishing such functions as insulation from surrounding environment, selective absorption qualities, multitasking operations such as cooling and heating, convolutions allow greater surface area within a given structure size, convolutions allow variability in positioning with minimal loss of efficiency, for example vertical, selective absorbers and filters are used to increase efficiency, multichannel design allows lower flow restriction encountered in other units, total insulation of a desired channel is possible, and structural integrity with insulation and high efficiency is possible allowing the unit to be used as roofing, decking, walls, etc.

BRIEF DESCRIPTION OF THE DRAWINGS

FIG. 1 is a top view of the subject solar panel;

FIG. 2 is a cross sectional view taken along AA of FIG. 1 showing the double layered preferred embodiment;

FIG. 3 is a cross sectional view showing a single layer of channels having a circular cross section;

FIG. 4 is a cross sectional view showing a double layer of channels and having a circular channel cross section; and FIG. 5 is a cross sectional view showing a single layer of channels having a triangular cross section.

DETAILED DRAWING DESCRIPTION

FIG. 1 is a top view of the subject panel showing structural element (a). Moving to FIG. 2, a cross sectional view taken along line AA of FIG. 1, structural elements (a), (b) and (c) are seen enclosing and in contact with structural elements (e) and (f), thereby forming channels (g) and (h). In this illustration the cross section of (g) and (h) are shown to be triangular. It is intended to be within the scope of this invenion that the cross section be any desired one such as oval, circular, square, rectangular, etc. Further, the illustrated cross sections are shown to be of equal size. It is intended that these could be equal or not equal or any combination thereof. The thickness of the structural elements (a), (b), (c), (e), and (f) are shown to be the same. It is intended to be within the scope of this invention that they may be of any thickness and may be equal or not equal or any combination thereof. Any one, combination, or none of the structural elements (a), (b), (c), (e), and (f) could be translucent or opaque or any other desired character, such as carbon laden. The interior surface of structural element (a) is shown as (i). This is the surface normally coated with a selective absorbant or transmission material. It is intended that any surface or combination of surfaces could be so coated. The interior convolution angle is shown as (K). Force vectors are shown as (d).

FIG. 3 is a single layer configuration having three structural elements (a), (b), and (e) forming channels (g) and (h). FIG. 4 shows a double layer of the structure shown in FIG. 3. FIG. 5 illustrates a single layer of the structure described in FIG. 2. It should be emphasized that in FIGS. 2 through 5, in every instance there is a periodic meeting of two boundary layers at contact point (m). The periodicity of this contact is shown to be equal in nature. It is intended that this could be equal, unequal, or any distribution desired. Further in FIGS. 2 through 5 it should be noted that for solar radiation to penetrate to the innermost channels, it must penetrate at least two structural boundary layers. This provides the insulation from convective losses of radiant energy.

What is claimed is:

1. A solar heating and cooling apparatus comprising three essentially planar structures and two convoluted structures, each of said convoluted structures located between and in direct contact with a pair of planar structures in an alternating sequence forming thereby a plurality of fluid passageways and alternating insulation channels therebetween, each convoluted structure being continuous between a respective pair of planar structures, and a fluid flow control apparatus for controlling flow of fluid through the fluid passageways.

2. The device according to claim 1 wherein said convolutions are essentially parallel to each other.

3. The device according to claim 1 wherein each sequence comprising a planar structure, convoluted structure and planar structure defines a plurality of substantially triangular cross sections.

4. The device according to claim 3 wherein the triangular cross sections being oriented so that an apex of the triangular cross section associated with each of the convoluted structures contacts a common planar structure.

5. The device according to claim 4 wherein an apex associated with one of the convoluted structures contacts the common planar structure in registration with the point at which an apex, associated with the other one of the convoluted structures, contacts the common planar structure.

6. The device according to claim 5 wherein the insulation channels are filled with media for controlling the transmission of incident solar radiation therethrough.

7. The device according to claim 6 wherein the media is carbon dioxide.

8. The device according to claim 1 wherein one or more surfaces of the structures is coated with media for controlling the transmission of incident solar radiation therethrough.

9. The device according to claim 8 wherein each planar structure comprises a sheet of structural material and each convoluted structure comprises structural material.

10. The device according to claim 9 wherein the structural material is plastic.

11. The device according to claim 9 wherein the structural material is metal.

12. The device according to claim 10 wherein the flow control apparatus is formed from molded plastic.

13. The device according to claim 10 wherein at least one of the planar structures is translucent.

14. A solar heating and cooling apparatus, said apparatus lying in a plane, the apparatus comprising:
   a plurality of panels;
   a plurality of convolutions located between and in direct contact with the panels for forming a plurality of channels;
   means for introducing fluid flow in the channels, each channel having a cross section and a major axis in the direction of fluid flow within the channel, said major axis being defined as the intersection of a first and second line projection in the cross section such that the first line projection is parallel to the plane of the apparatus and halves the area of the channel cross section, and the second line projection is perpendicular to the plane of the apparatus and halves the area of the channel cross section, the boundaries of the channels forming respective boundary layers, at least one channel being positioned so that incident solar radiation penetrates at least two boundary layers, and the boundary layers periodically contact at least one other boundary layer; and
   means of controlling flow through the channels.

15. The device according to claim 14 wherein the periodic contact of the multiple boundary layers occurs between the channels and the panels.

16. The device according to claim 15 wherein the adjacent points of periodic contact are equally spaced.

17. The device according to claim 14 wherein the major axes of alternate channels lie in a first plane, and the major axes of remaining alternate channels lie in a second plane different than the first plane.

18. The device according to claim 17 wherein the cross sections of the channels are substantially triangular, the channels being arranged in a row.

19. The device according to claim 14 wherein the major axes are parallel to each other.

20. The device according to claim 14 wherein at least one panel is translucent.

21. The device according to claim 14 wherein at least one channel contains a media for controlling the transmission of incident solar radiation therethrough.

22. The device according to claim 21 wherein the media is carbon dioxide.

23. The device according to claim 14 wherein the boundary layers comprise structural elements and at least one of the surfaces of the structural elements is coated with media for controlling the transmission of incident solar radiation therethrough.

24. The device according to claim 17 wherein the cross section of the channels is substantially circular.

25. A solar heating and cooling apparatus comprising two planar structural elements and one non-planar structural element, the non-planar element located between the planar elements and in periodic contact with each planar element thereby defining structural boundary layers such that incident solar radiation penetrates at least two structual boundary layers, the nonplanar elements being a continuous structure between the planar elements.

26. The device according to claim 14 wherein at least one panel comprises thermal glass.

* * * * *